United States Patent [19]

Burchi

[11] Patent Number: 5,542,747
[45] Date of Patent: Aug. 6, 1996

[54] SEAT HAVING A FRAME ELEMENT OF HIGH-DENSITY, RIGID FOAM

[75] Inventor: Charles R. Burchi, Milford, Mich.

[73] Assignee: Woodbridge Foam Corporation, Mississauga, Canada

[21] Appl. No.: 370,256

[22] Filed: Jan. 9, 1995

Related U.S. Application Data

[62] Division of Ser. No. 23,118, Feb. 26, 1993, Pat. No. 5,400,490.

[51] Int. Cl.$^6$ .................................................. A47C 7/02
[52] U.S. Cl. ................................ 297/452.55; 297/DIG. 1; 297/DIG. 2; 297/463.1
[58] Field of Search ........................ 297/452.55, 452.23, 297/452.24, 452.25, 452.26, 452.27, 218.3, 218.1, 440.1, 440.22, DIG. 1, DIG. 2, 463.1; 296/63; 24/343, 346, 566

[56] References Cited

U.S. PATENT DOCUMENTS

| | | | |
|---|---|---|---|
| 777,095 | 12/1904 | Harvey | 24/343 |
| 1,865,175 | 6/1932 | Dinkel | 297/440.22 X |
| 2,120,036 | 6/1938 | Northup | 297/218.3 X |
| 2,124,049 | 7/1938 | Battista et al. | 24/343 X |
| 2,651,483 | 9/1953 | Ritchie et al. | 24/343 X |
| 2,832,212 | 4/1958 | Olsen | 24/343 X |
| 3,264,382 | 8/1966 | Angell et al. | 264/46.4 |
| 3,327,029 | 6/1967 | Pincus et al. | 264/46.4 |
| 3,534,129 | 10/1970 | Bartel | 264/255 |
| 3,858,370 | 1/1975 | Halstead | 24/346 X |
| 4,065,182 | 12/1977 | Braniff et al. | 297/440.22 |
| 4,191,417 | 3/1980 | Ferrara | 296/65 R |
| 4,544,126 | 10/1985 | Mellhert | 249/83 |
| 4,588,229 | 5/1986 | Jay | 297/452.25 |
| 4,701,474 | 10/1987 | Bailey, Jr. et al. | 521/137 |
| 4,837,881 | 6/1989 | Kondo et al. | 5/464 |
| 4,861,104 | 8/1989 | Malak | 297/218.3 |
| 4,873,036 | 10/1989 | Urai | 264/46.6 |
| 5,089,191 | 2/1992 | Hughes | 264/46.5 |
| 5,096,639 | 3/1992 | Hughes | 264/46.5 |
| 5,106,548 | 4/1992 | Matsuura et al. | 264/46.6 |
| 5,116,556 | 5/1992 | Danton | 264/464 |
| 5,132,063 | 7/1992 | Hughes | 264/46.4 |
| 5,132,064 | 7/1992 | Iwasawa et al. | 264/46.4 |
| 5,176,860 | 1/1993 | Storch | 264/45.1 |
| 5,389,316 | 2/1995 | Kerman | 264/46.5 |
| 5,409,649 | 4/1995 | Pool | 264/51 |

FOREIGN PATENT DOCUMENTS

| | | | |
|---|---|---|---|
| 501803 | 4/1954 | Canada | 24/346 |
| 0251659 | 6/1987 | European Pat. Off. | B29C 67/22 |
| 0309325 | 9/1988 | European Pat. Off. | B29C 45/14 |
| 58-119833 | 7/1983 | Japan | 264/46.7 |
| 2197659 | 5/1988 | United Kingdom | C08G 18/14 |
| 2216837 | 10/1989 | United Kingdom | B29C 39/12 |
| WO9114566 | 10/1991 | WIPO | B29C 67/22 |
| WO9303910 | 3/1993 | WIPO | B29C 67/22 |

*Primary Examiner*—Milton Nelson, Jr.
*Attorney, Agent, or Firm*—Fitzpatrick, Cella, Harper & Scinto

[57] ABSTRACT

An automotive vehicle passenger seat is described. The seat includes a frame element made from a relatively high density rigid foam, a vehicle anchorage connector and a seat body including a resilient material fixed with respect to the frame element. The vehicle anchorage connecter serves to anchor the seat to the automotive vehicle. The seat obviates the need for a metal frame thereby reducing the cost and weight of the seat, and improving the recyclability thereof. In a preferred embodiment, the seat further includes a pelvic support element which acts as an anti-submarine device.

30 Claims, 7 Drawing Sheets

SEAT HAVING A FRAME ELEMENT OF HIGH-DENSITY, RIGID FOAM

CROSS-REFERENCE TO RELATED APPLICATION

This application is a divisional of application Ser. No. 08/023,118 filed on Feb. 26, 1993, now U.S. Pat. No. 5,400,490.

BACKGROUND OF THE INVENTION

1. Field of the Invention

The present invention relates to a seat and particularly to a passenger seat for use in vehicles. More specifically, the present invention relates to a novel passenger seat for vehicles which obviates the need for including a metal frame. The present invention also relates to a process for producing a passenger seat, particularly a passenger seat for use in vehicles.

2. Description of the Prior Art

Passenger seats in vehicles such as automobiles are typically fabricated from a foam (usually polyurethane) material which is molded into the desired shape and covered with an appropriate trim cover. The foamed material is selected to provide passenger comfort by providing a resilient seat and the trim cover is selected to provide the desired aesthetic properties.

To meet desired safety standards, passenger seats in vehicles such as automobiles now often provide anti-"submarine" properties. Submarining is the term used to describe the tendency of the pelvis of a seated passenger to move forward and down during a collision. When the passenger is wearing a shoulder harness or lap type seatbelt, this tendency can result in the seatbelt strangling the passenger with fatal consequences. Accordingly, it is known in the art to design passenger seats with anti-submarine properties. These properties may be provided by rigid or semi-rigid members embedded in the seat and which provide additional pelvic support to the passenger during a collision. To function properly, these members cannot move and thus, must be fixed (directly or indirectly) to the vehicle.

It is also known in the art that, while the resiliency of the foamed material in the seat provides passenger comfort, it does not provide the necessary structural strength for the seat. This necessitates additional reinforcement of the seat to provide the degree of structural strength required to ensure proper mounting of the seat within the vehicle and proper support of anti-submarine elements. Accordingly, prior art vehicular seats typically include a perimeter frame of metal which strengthens the seat. Further, support rails are typically mounted across the metal frame to stiffen the frame and to provide a suitable attachment point for the means used to anchor the seat to the vehicle. Conventionally, the metal frame and/or support rails are substantially completely embedded in the foam material when the seat is molded.

Of course, the requirement for such a perimeter metal frame and for support rails adds to the cost of manufacturing the seat and, more importantly, adds to the weight of the seat and the overall weight of the vehicle in which it is installed. This added weight increases both the cost of shipping the seat to the vehicle manufacturer and the eventual lifetime operating expense for the vehicle. Finally, the presence of metal frame and support rails or other components in the seat hampers the eventual recycling of the seat materials which is becoming increasingly important in today's environmentally concerned marketplace.

Therefore, it would be desirable to have a passenger seat, particularly a vehicle seat, which does not require the presence of a conventional metal frame or support rails.

SUMMARY OF THE INVENTION

It is an object of the present invention to provide a novel passenger seat.

It is another object of the present invention to provide a novel method of manufacturing a passenger seat.

Accordingly, in one of its aspects, the present invention provides a passenger seat comprising: a frame element molded from relatively high density, rigid foam; vehicle anchorage means connected to the frame element; and a seat body comprising a resilient material fixed with respect to the frame element.

Ideally, the resilient material is a relatively low density, resilient foam, more preferably a polyurethane foam. However, it will be appreciated by those of skill in the art that the resilient material may be a non-foam material such as fibrous matrices (e.g. horse hair, organic fibres and the like).

In another of its aspects, the present invention provides a process for producing a passenger seat in a mold comprising a first mold half and a second mold half engagable to define a mold cavity, the process comprising the steps of:

(i) placing a frame element molded from relatively high density, rigid foam in the first mold half, the frame element having connected thereto vehicle anchorage means;

(ii) dispensing a liquid foamable polymeric composition in at least one of the first mold half and the second mold half;

(iii) closing the first mold half and the second mold half;

(iv) allowing the liquid foamable polymeric composition to expand to fill substantially the mold cavity to produce a relatively low density, resilient seat body which is fixed to at least a portion of the frame element.

Preferably, a pelvic support element is provided in the seat. Preferably, such a pelvic support element is molded foam made of the same material as the frame element. Also preferably, the vehicle anchorage means includes a portion which is embedded in either the pelvic support element or the frame element, or both, when they are molded. More preferably, the pelvic support element and the frame element are integrally molded and a portion of vehicle anchorage means is embedded in the integrally molded frame and pelvic support elements when they are molded.

Preferably, the process of the present invention comprises the further step of applying a trim cover to the seat.

In one embodiment, the application of a trim cover may be done upon completion of step (iv) of the present process after the seat is removed from the mold.

In another embodiment, the application of a trim cover may be done during the present process. Application of a trim cover during production of a foamed seat or padded element is discussed in U.S. Pat. Nos. 5,089,191, 5,096,639 and 5,132,063, the contents of each of which are incorporated herein by reference. In the context of the present process, this could be done by designating the first mold half as the upper mold and the second mold half as the lower half. The trim cover is then affixed to the upper mold and step (i) of the present process would be carried out in the lower mold. Step (ii) of the present process would comprise dispensing the liquid foamable composition into the lower mold. Step (iv) of the present process would comprise allowing the liquid foamable polymeric composition to expand from the lower mold toward the inner surface of the trim cover affixed in the upper mold.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

In order to describe the present invention clearly, a brief description of a prior art seat will first be made, with reference to FIG. 1, before describing the embodiments of the present invention shown in FIGS. 2 through 10.

Figure 1:
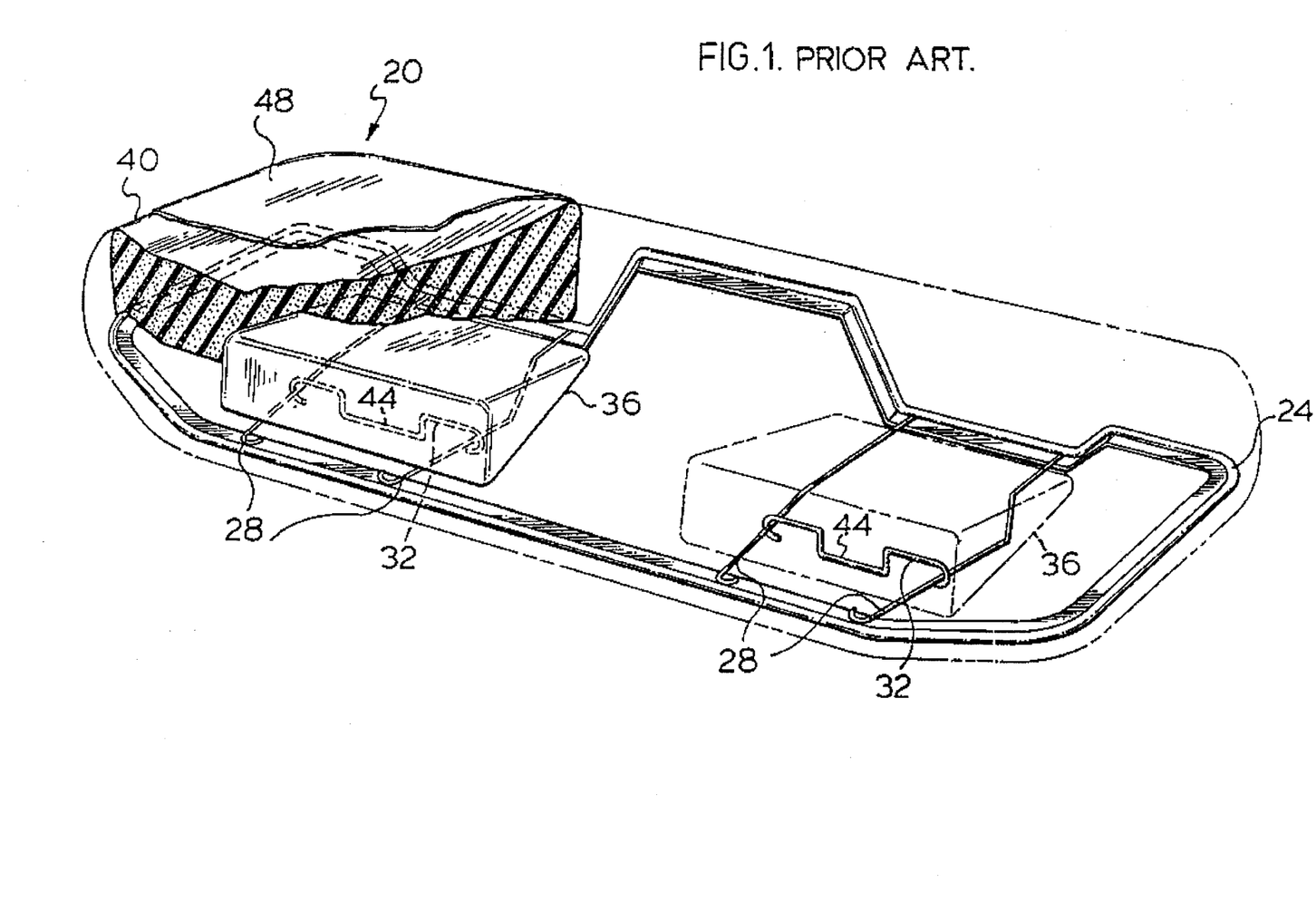
FIG. 1 illustrates a perspective view, partially cut away, of a prior art seat.

A prior art automotive passenger rear seat is indicated at 20 in FIG. 1. The seat includes a metal perimeter frame 24 to which two pairs of support rails 28 are connected. Each pair of support rails 28 is in turn connected to a vehicle attachment rail 32 which is provided to attach the completed seat to the vehicle. A pelvic support element 36 rests upon each pair of support rails 28. As is known by those of skill in the art, each pelvic support element 36 may be a rigid hollow plastic or metal member, or a high density foam member whose shape is selected to reduce 'submarining' of passengers.

When the prior art seat is molded, the assembly of the perimeter frame 24, support rails 28, pelvic support elements 36 and attachment rails 32 is placed into a mold and an predetermined amount of a liquid foamable polymeric composition is placed into the mold. As the liquid foamable composition expands and cures, the above-mentioned assembly of perimeter frame 24, support rails 28, pelvic support elements 36 and attachment rails 32 is encased by the cured foam 40 with the connection portion 44 of attachment rail 32 extending from cured foam 40. The seat is then covered with an appropriate trim cover 48 typically by placing a pre-sewn cover over the seat and attaching the trim cover to the frame 24 using suitable mechanical attachment means (e.g. VELCRO (i.e. a hook and loop connection system), hogrings, J-retainers, push pins and the like). The completed seat may then be shipped to the vehicle assembler and installed in the vehicle.

Figure 2:
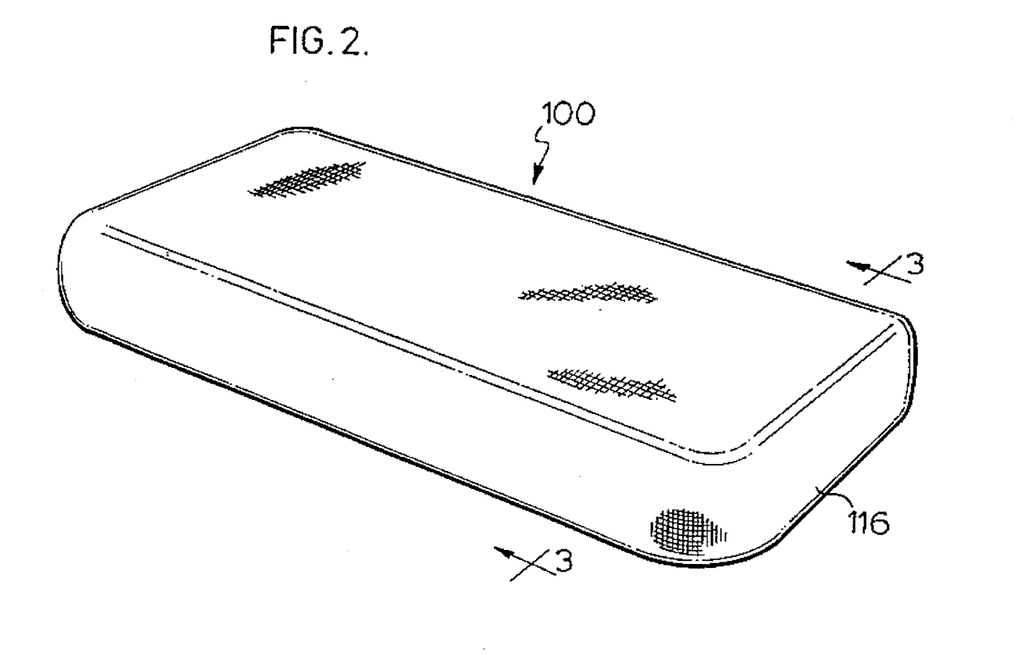
FIG. 2 illustrates a finished seat in accordance with the present invention.
Figure 3:
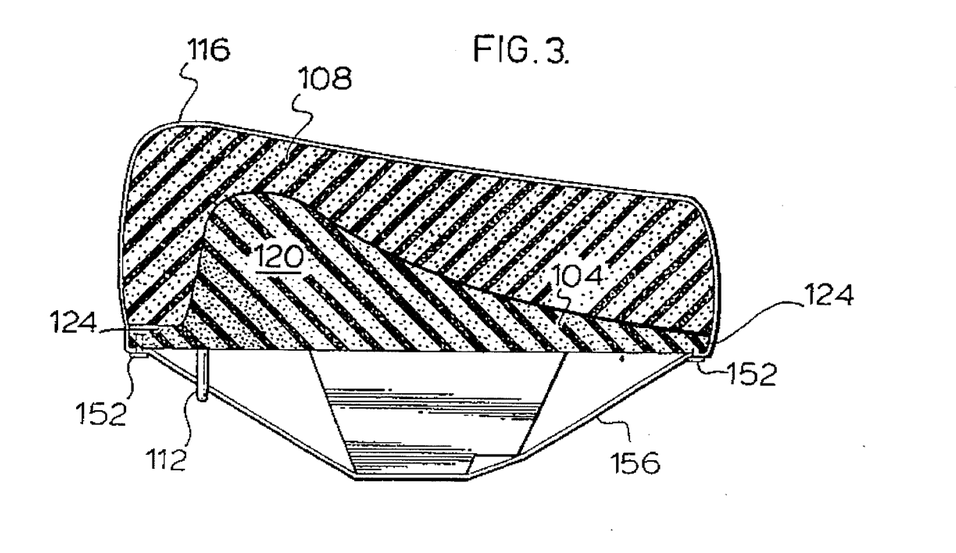
FIG. 3 illustrates a section taken along 3—3 in FIG. 2.

The present invention will now be described with reference to FIGS. 2 through 10. FIGS. 2 and 3 illustrate a finished automotive rear passenger seat 100 in accordance with the present invention. As shown in FIG. 3, the seat comprises a frame and pelvic support element 104, a seat body 108, a vehicle anchorage means 112 and a trim cover 116.

Figure 4:
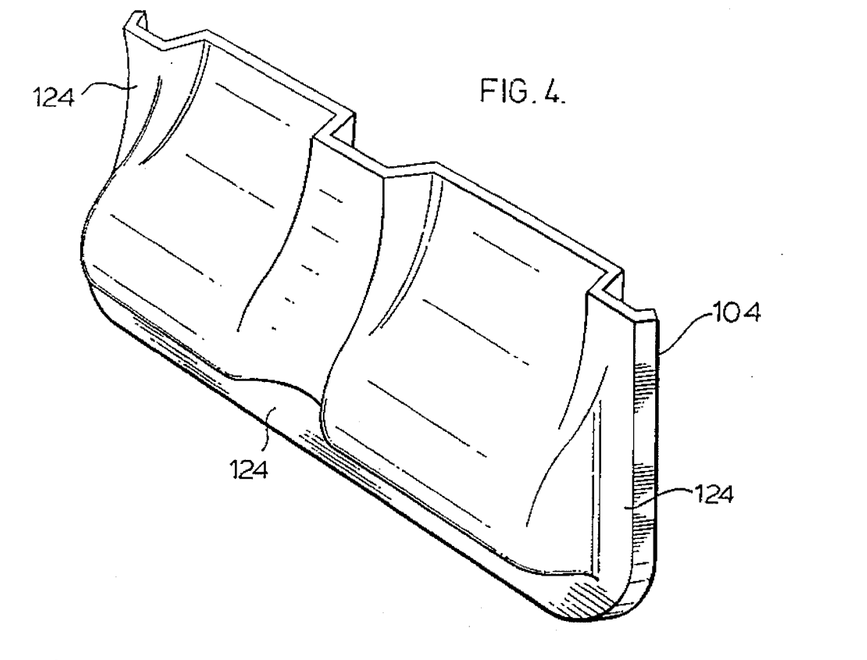
FIG. 4 illustrates a perspective view of a frame and pelvic support element.
Figure 5:
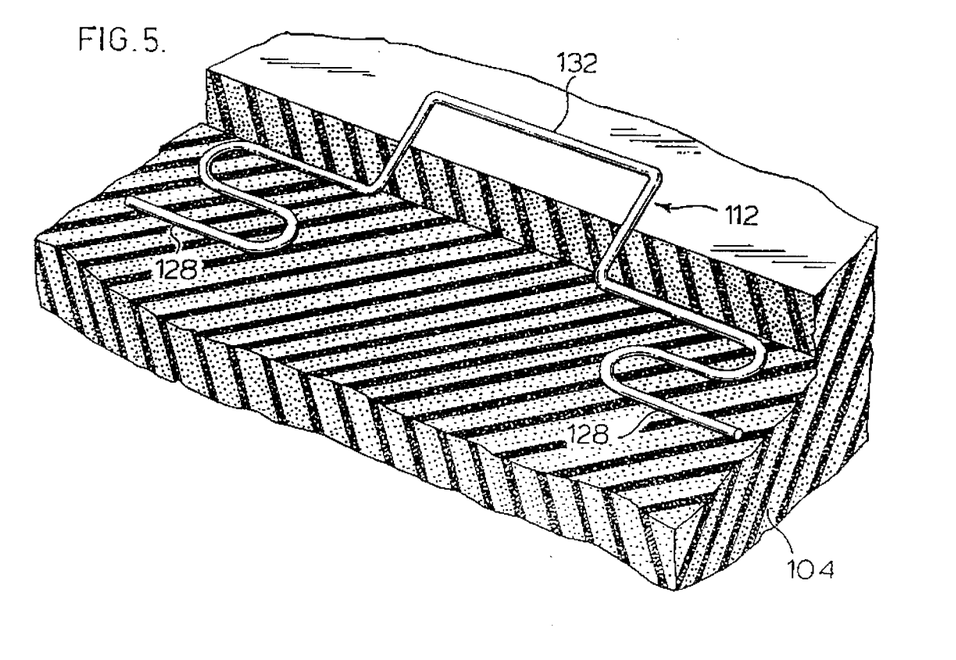
FIG. 5 illustrates an enlarged partial section of a portion of a frame and pelvic support element and a vehicle anchorage means.

Frame and pelvic support element 104 is best illustrated in FIGS. 4 and 5. Preferably, frame and pelvic support element 104 is made from a polymeric foam material, most preferably from a relatively high density, rigid polyurethane foam. When frame and pelvic support element 104 is such a relatively high density, rigid polyurethane foam, it may be fabricated utilizing a conventional clam-shell foam mold which has been suitably adapted to include means to retain in place vehicle anchorage means 112 in one of the molds. Specifically, an anchor portion 132 of vehicle anchorage means is positioned in a suitable recess (not shown) in one of the molds with S-shaped arms 128 of vehicle anchorage means 112 extending into the mold cavity. A liquid foamable polyurethane composition is then dispensed in the cavity of the foam mold using an open pour or closed pour technique. The composition then expands to fill substantially the foam mold to produce frame and pelvic support element 104 having S-shaped arms 128 of vehicle anchorage means 112 embedded therein.

In a preferred aspect of the invention, the foam of frame and pelvic support element 104 has an indentation force deflection at 25% deflection in the range of from about 150 to about 4,000 pounds, more preferably from about 500 to about 2500 pounds, most preferably from about 900 to about 2000 pounds, when measured pursuant to ASTM 3574-$B_1$.

It will be appreciated by a person skilled in the art that it is only the frame element of the seat of the present invention which must be made of foam, preferably polyurethane foam, and it is this foam which should meet the ASTM test recited in the previous paragraph.

After expansion of the liquid foamable polyurethane composition, the polyurethane foam of frame and support pelvic element 104 preferably has a specific gravity of less than about 0.40, more preferably in the range of from about 0.10 to about 0.25. Preferably, the liquid foamable polyurethane composition used to produce frame and support element 104 has a free rise density of from about one to about twenty pounds per cubic foot, more preferably from about two to about eight pounds per cubic foot. For most mold foams, this would give use to a foam core having a density in the range of from about 1.5 to about 24 pcf, more preferably from about 2.5 to about 12 pcf.

Non-limiting and preferred examples of suitable polyurethane foams for use in producing frame and pelvic support element 104 are available from Woodbridge Foam Corporation under the tradename Enerflex.

Generally, the polyurethane foam suitable for use in producing frame and pelvic support element 104 and having the requisite characteristics may be produced from the following general non-limiting formulation:

| Component | Amount |
| --- | --- |
| Polymer Polyol | 100–0 parts |
| Polyol | 0–100 parts |
| Crosslinker | 0–30 parts/100 parts total polyol |
| Catalyst | 0.05 to 3.5 parts/100 parts total polyol |
| Silicone Surfactants | 0–1.5 parts/100 parts total polyol |
| $H_2O$ | 0.5 to 3.5 parts/100 parts total polyol |
| Isocyanate | Adequate quantity for an index of from about .60 to 1.30 ratio of NCO |

-continued

| Component | Amount |
| --- | --- |
| | equivalents to the equivalents of NCO reactive sites. |

Suitable polymer polyols, polyols and isocyanates are described in U.S. Pat. Nos. 3,304,273, 3,383,351, 3,523,093, 3,939,106 and 4,134,610, Belgian patent 788,115, Canadian Patent 785,835 and "Polymer/Polyols, a New Class of Polyurethane Intermediate", Kuryla, W. C. et al., J. Cellular Plastics, March (1966), the contents of which are hereby incorporated by reference. Suitable crosslinkers, catalysts and silicone surfactants are described in U.S. Pat. Nos. 4,107,106 and 4,190,712, the contents of which are hereby incorporated herein by reference.

The preferred polyurethane foam suitable for use in frame and pelvic support element 104 may be produced from the following formulation:

| Component | Amount |
| --- | --- |
| Polymer Polyol[1] | 20–100 parts |
| Polyol[2] | 0–80 parts |
| Crosslinker[3] | 5–15 parts/100 parts total polyol |
| Catalyst[4] | 0.5–1.2 parts/100 parts total polyol |
| Silicone Surfactants[5] | 0.3–1.1 parts/100 parts total polyol |
| $H_2O$ | 1.75–2.75 parts/100 parts total polyol |
| Isocyanate[6] | Adequate quantity for an index of from about 0.8 to 1.1 ratio of NCO equivalents to the equivalents of NCO reactive sites. |

[1]AC West Virginia Polyol Co. NIAX 31-28
[2]5000 MW propylene oxide adduct of glycerine with 75% primary capping
[3]BASF 953
[4]DABCO R-8020
[5]Goldschmidt B-4113
[6]Dow Chemical Company PAPI 901

As shown in FIG. 4, frame and pelvic support element 104 includes a flange portion 124 which serves as a rigid edge support to minimize or prevent scalloping of the trim fabric and thereby maintain a smooth appearance in the finished seat. The provisions of element 104 serves to stiffen the completed seat obviating the prior art requirement for a perimeter metal frame or the like. Further, when element 104 is molded, S-shaped arms 128 of vehicle anchorage means 112 are embedded into the lower side of element 104 with the anchor portion 132 of vehicle anchorage means 112 extending from element 104 as shown in FIG. 5. The use of an embedded vehicle anchorage means 112 obviates the prior art requirement for support rails or the like. A seat in accordance with the present invention may be constructed through the following steps.

Figure 6:
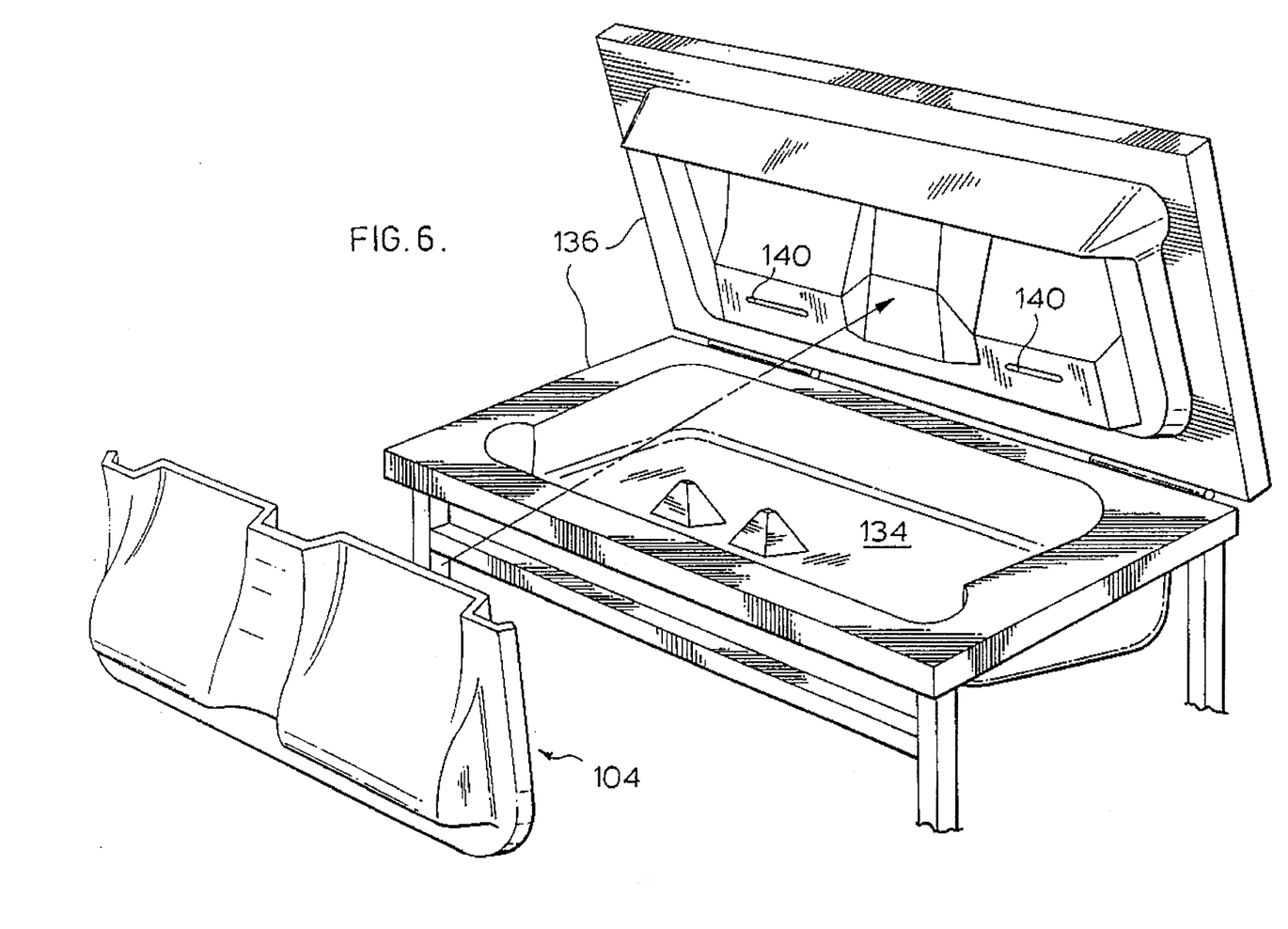
FIGS. 6–8 illustrate sequential steps of the process of the present invention.
Figure 7:
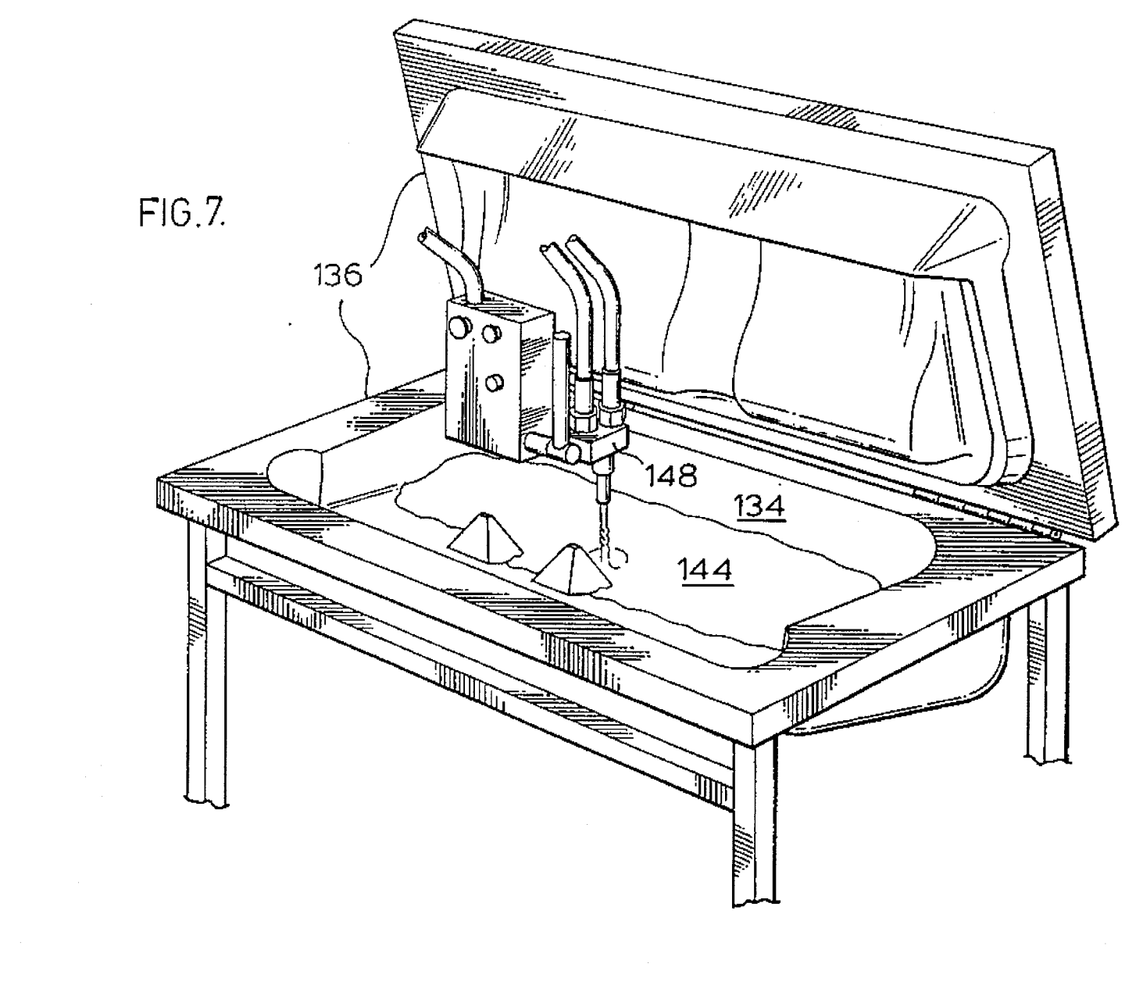

Once frame and pelvic support element 104 is molded, it is placed into the cavity 134 of a clam-shell mold 136, with anchor portion 132 of each vehicle anchorage means 112 being received in mold apertures 140 as shown in FIG. 6. A liquid foamable polymeric composition 144 is then dispensed into cavity 134 from a mixing head 148, as shown in FIG. 7, and the mold 136 is closed. Preferably, polymeric composition 144 is a polyurethane composition formulated to provided a relatively low density, resilient polyurethane foam. Such foams are conventional and use thereof in the automotive seating industry is well known. Accordingly, the form of liquid foamable polymeric composition 144 suitable for use herein and the manner by which it is dispensed into the lower mold is not particularly restricted. Preferably, the foamable polymeric composition comprises a polyurethane derived from a diphenylmethane diisocyanate (MDI)-based system of low index and of a high molecular weight conventional polyol. Such a system is typically completely "water blown" using highly-catalysed odourless amines and a cell regulator. Typically, this system cures at room temperature in about 3 minutes or less. Alternatively, the polyurethane is a tolylene diisocyanate (TDI)-based system of low index and of a high molecular weight conventional polyol. When such a TDI-based system is used, the cells of the foam in the finished padded element must be substantially open. Opening of such foam cells is within the purview of a person skilled in the art and can be accomplished by any convenient means such as crushing, kneading, roll pressing, chemical treatment and the like of the padded element while ensuring that the trim cover is not damaged during this step. It will be appreciated that the liquid foamable polymeric composition may comprise a mixture of MDI-based and TDI-based systems.

Figure 8:
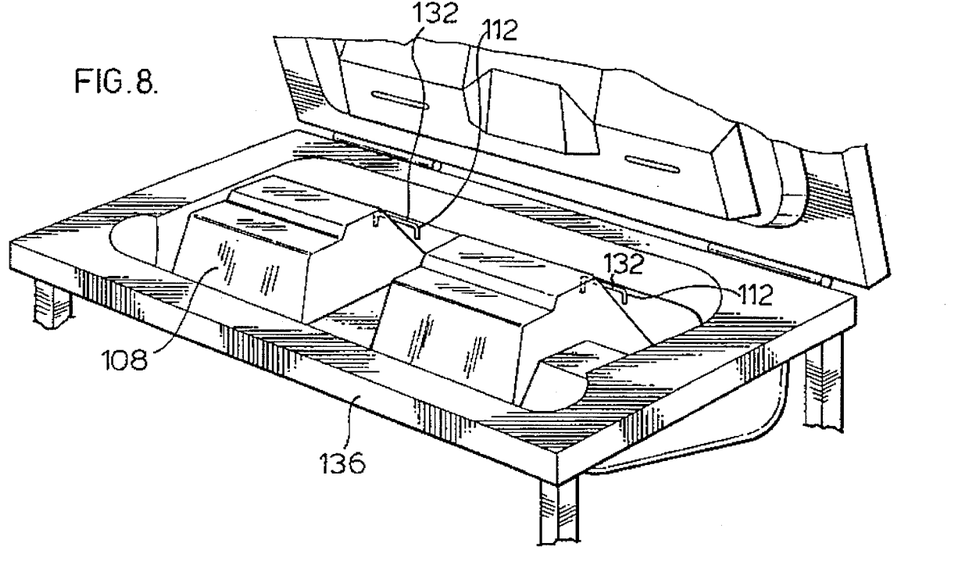

After composition 144 is dispensed in the mold, it expands to fill the mold cavity thereby producing foam body 108 which is bonded to frame and pelvic support element 104. Once seat body 108 has cured, mold 136 may be opened, as shown in FIG. 8, and the assembly of seat body 108 and frame and pelvic support element 104 removed from the mold. As is shown in FIG. 8, when properly molded the anchor portion 132 of each vehicle anchorage means 112 still extends beyond seat body 108.

Trim cover 116 may then be placed on the assembly of seat body 108 and frame and pelvic support element 104 to complete the assembly of seat 100.

Figure 9:
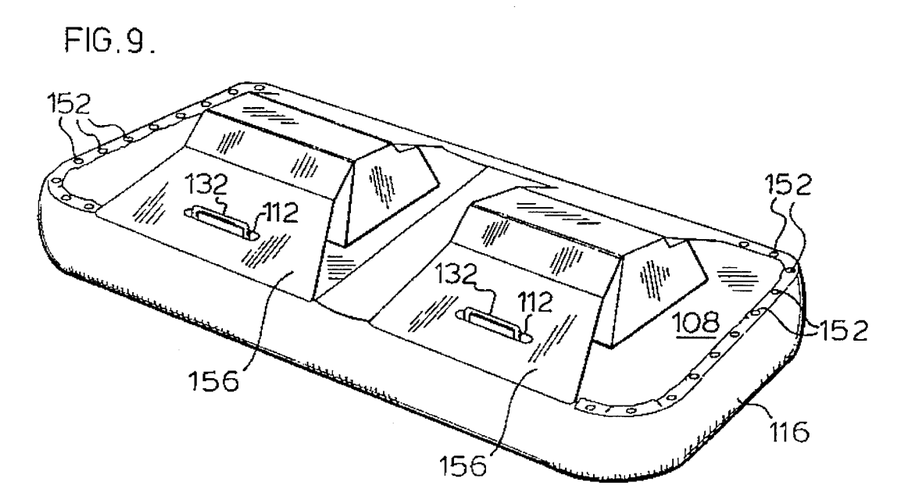
FIG. 9 illustrates a perspective view of the bottom of a finished seat in accordance with the present invention.

While trim cover 116 may be attached in any suitable manner as would be apparent to those of skill in the seat art, it has been found that push pins 152 may be favorably employed. In the preferred embodiment, push pins 152 are placed such that they engage the higher density foam of flange portion 124 of frame and pelvic support element 104 as shown in FIGS. 3 and 9. As will be apparent to those of skill in the art, bottom flaps 156 may also be employed, in combination with conventional mechanical attachment means (e.g. VELCRO (i.e. a hook and loop connection system), J-retainers, push pins and the like), to further assist the attachment of trim cover 116 to complete the assembly of seat 100.

Additionally, as previously described, the trim cover may be attached as the present seat is being molded. In this alternative (not shown), the trim cover would be placed in the upper half of the mold and the frame and pelvic support element installed in the lower half of the mold. The liquid foamable polymeric composition would then be dispensed into the lower half of the mold, the mold closed and the composition expands toward and bonds to the trim cover.

As will be apparent to those of skill in the art, the ability to insert push pins 152 into the relatively high density, rigid foam of frame and pelvic support element 104 allows attachment of the trim cover without the need for other labour intensive techniques such as hogrings.

Figure 10:
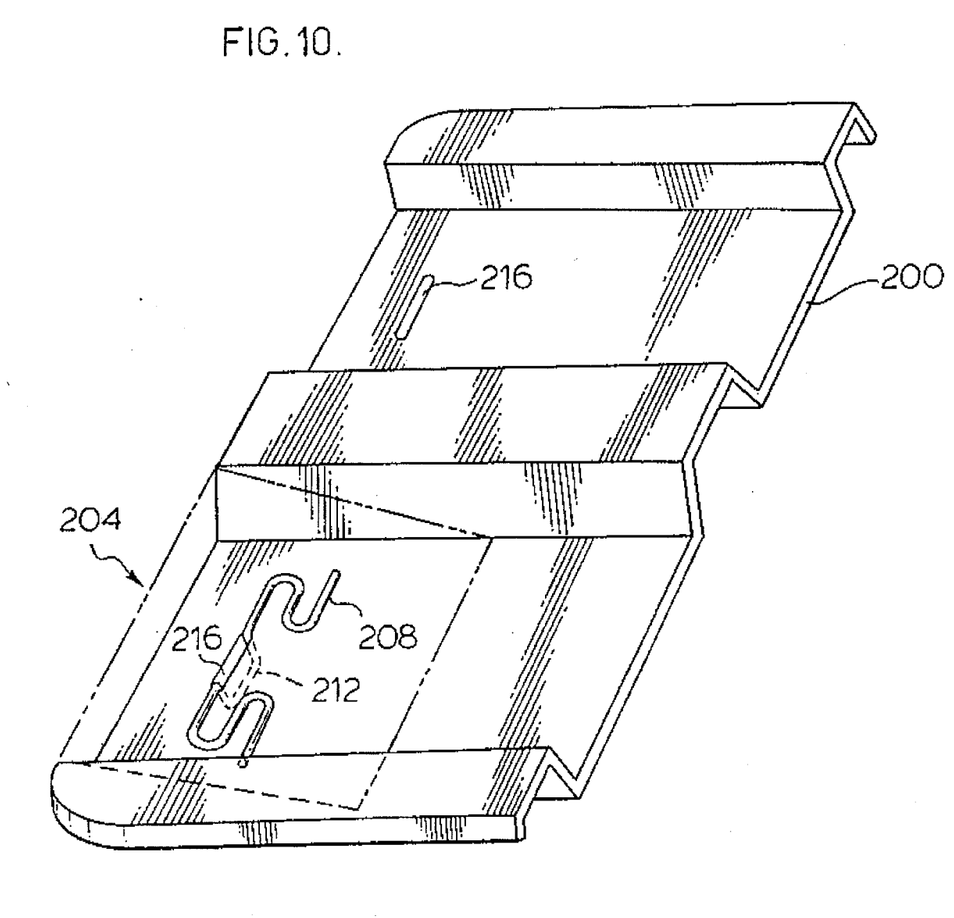
FIG. 10 illustrates a perspective view of another embodiment of a frame element and pelvic support elements used in the seat of the present invention.

A second embodiment of the present invention is shown in FIG. 10 wherein separate frame and pelvic support elements are combined to obtain the equivalent of the above-described frame and pelvic support element 104. Specifically, a frame element 200 is molded from the above-mentioned relatively high density, rigid polyurethane foam. Frame element 200 is sized and shaped as required by the desired seat design and may be planar or contoured as required.

Suitable pelvic support elements 204, either molded from the same or similar relatively high density, rigid polyurethane foam as frame element 200 or fabricated from rigid plastic or other suitable materials, are placed on frame element 200. When pelvic support elements 204 are molded from the same relatively high density, rigid polyurethane foam as frame element 200, vehicle anchorage means 208 may be embedded into pelvic support elements 204 as shown. Alternatively, vehicle anchorage means 208 may be embedded into frame element 200 when it is molded (not shown) instead of or in addition to similar means embedded in pelvic support elements 204.

To construct this embodiment of the invention, pelvic support elements 204 are appropriately placed on frame element 200 and, if vehicle anchorage means 208 are embedded in pelvic support elements 204, the connection portion 212 of each vehicle anchorage means is inserted through a complementary aperture 216 in frame element 200. The assembly of frame element 200 and anti-submarine elements 204 is then placed into a mold, such as mold 136 described above, and the remaining steps in the construction of the seat are the same as those previously described above.

While this second embodiment requires additional labour to assemble pelvic support elements 204 and frame element 200, it is contemplated that advantages will be obtained in that a single pelvic support element 204 may be designed and pre-manufactured for use in different seats. Further, as will be apparent, it is possible to employ different foam compositions for frame member 200 and pelvic support elements 204 to further optimize the characteristics thereof.

It will be appreciated by those of skill in the art that, in accordance with the spirit of the invention, the pelvic support elements 204 are not necessary in all applications of the invention since not all passenger seats are designed to provide anti-submarining.

While the description above relates to a two passenger rear vehicle seat, it will be understood by those of skill in the art that the present invention is not so limited. It is contemplated by the inventor that the present invention will be useful for multi or single passenger seats in a vehicle.

The present invention provides an improved passenger seat for use in vehicles which obviates the requirement for a metal frame and/or support rails. With the present invention, a seat is constructed which in its preferred embodiment, meets safety requirements for anti-submarining characteristics, and anchoring strength and vehicle assembler requirements for strength and rigidity of the seat during vehicle assembly are met without incurring the penalty of the additional weight of metal frame and support components. Further, the additional costs of tooling and fabricating metal frame and support components is avoided and eventual recycling of the seat is simplified.

What is claimed is:

1. An automobile vehicle passenger seat comprising:
   a frame element molded from relatively high density, rigid foam, said rigid foam having an indentation force deflection at 25% deflection of from about 500 pounds to about 4,000 pounds when measured pursuant to ASTM 3574-$B_1$;
   vehicle anchorage means connected to the frame element, said vehicle anchorage means and said frame element for anchoring said seat to the automobile vehicle; and
   a seat body comprising a resilient material fixed with respect to the frame element.

2. A passenger seat according to claim 1 wherein said resilient material comprises foam.

3. A passenger seat according to claim 1 wherein said resilient material comprises a fibrous material.

4. A passenger seat according to claim 1 wherein said frame element is bonded to said seat body.

5. A passenger seat according to claim 1 further comprising at least one pelvic support element connected to said frame element.

6. A passenger seat according to claim 5 wherein said at least one pelvic support element and said frame element are integrally molded as a unitary element.

7. A passenger seat according to claim 5 wherein said vehicle anchorage means includes an anchor portion to engage a portion of the automobile vehicle and an attachment portion embedded in said at least one pelvic support element.

8. A passenger seat according to claim 1 wherein said vehicle anchorage means includes an anchor portion to engage a portion of the automobile vehicle and an attachment portion intended to be embedded in said frame element.

9. A passenger seat according to claim 8 wherein said attachment portion comprises two S-shaped arms each connected to a different end of said attachment portion.

10. A passenger seat according to claim 1 further comprising a trim cover.

11. A passenger seat according to claim 10 wherein said trim cover is attached to said seat by fasteners which engage said frame element.

12. A passenger seat according to claim 10 wherein said trim cover is bonded to said resilient material.

13. An automobile vehicle passenger seat comprising:
   a frame element molded from relatively high density, rigid foam;
   vehicle anchorage means connected to the frame element, said vehicle anchorage means and said frame element for anchoring said seat to the automobile vehicle; and
   a seat body comprising a resilient material fixed with respect to the frame element, said resilient material being selected from a group consisting of foam and fibrous material, said rigid foam having an indentation force deflection at 25% deflection of about 150 to about 4,000 pounds when measured pursuant to ASTM 3574-$B_1$.

14. A passenger seat according to claim 13 wherein said rigid foam has an indentation force deflection at 25% deflection of from about 500 to about 4,000 pounds when measured pursuant to ASTM 3574-$B_1$.

15. A passenger seat according to claim 13 wherein said vehicle anchorage means includes an anchor portion to engage a portion of the automobile vehicle and an attachment portion embedded in said frame element.

16. A passenger seat according to claim 13 wherein the resilient material comprises foam.

17. A passenger seat according to claim 13 wherein the frame element is bonded to the seat body.

18. A passenger seat according to claim 13 further comprising at least one pelvic support element connected to said frame element.

19. A passenger seat according to claim 18 wherein said at least one pelvic support element and said frame element are integrally molded as a unitary element.

20. A passenger seat according to claim 18 wherein said vehicle anchorage means includes an anchor portion to engage a portion of the automobile vehicle and an attachment portion embedded in said at least one pelvic support element.

21. A passenger seat according to claim 13 further comprising a trim cover.

22. A passenger seat according to claim 21 wherein said trim cover is attached to said seat by fasteners which engage said frame element.

23. A passenger seat according to claim 21 wherein said trim cover is bonded to said resilient material.

24. An automobile vehicle passenger seat comprising:

a frame element molded from relatively high density, rigid polyurethane foam having an indentation force deflection at 25% deflection of from about 500 pounds to about 4,000 pounds when measured pursuant to ASTM 3574-$B_1$;

vehicle anchorage means connected to the frame element, said vehicle anchorage means including an anchor portion to engage a portion of the automobile vehicle and an attachment portion embedded in said frame element, said vehicle anchorage means and said frame element for anchoring said seat to the automobile vehicle; and a seat body comprising a resilient polyurethane foam fixed with respect to the frame element.

25. A passenger seat according to claim 24 further comprising at least one pelvic support element connected to said frame element.

26. A passenger seat according to claim 25 wherein said at least one pelvic support element and said frame element are integrally molded as a unitary element.

27. A passenger seat according to claim 24 further comprising a trim cover.

28. A passenger seat according to claim 27 wherein said trim cover is attached to said seat by fasteners which engage said frame element.

29. A passenger seat according to claim 24 wherein said trim cover is bonded to said resilient material.

30. A passenger seat according to claim 24 wherein the frame element is bonded to the seat body.

* * * * *